March 13, 1962 D. C. EVANS ETAL 3,025,499

TABULATING CARD SYSTEM

Filed Sept. 26, 1958 5 Sheets-Sheet 1

DAVID C. EVANS
SHIGERU OCHI
*INVENTOR.*

*BY* Byard G. Nilsson

DAVID C. EVANS
SHIGERU OCHI
*INVENTOR.*

BY Byard G. Nilsson

SHEET 2

DAVID C. EVANS
SHIGERU OCHI
INVENTOR.

BY Byard G. Nilsson

March 13, 1962 D. C. EVANS ET AL 3,025,499

TABULATING CARD SYSTEM

Filed Sept. 26, 1958 5 Sheets-Sheet 4

DAVID C. EVANS
SHIGERU OCHI
*INVENTOR.*

BY Byard G. Nilsson

March 13, 1962 D. C. EVANS ETAL 3,025,499
TABULATING CARD SYSTEM
Filed Sept. 26, 1958 5 Sheets-Sheet 5
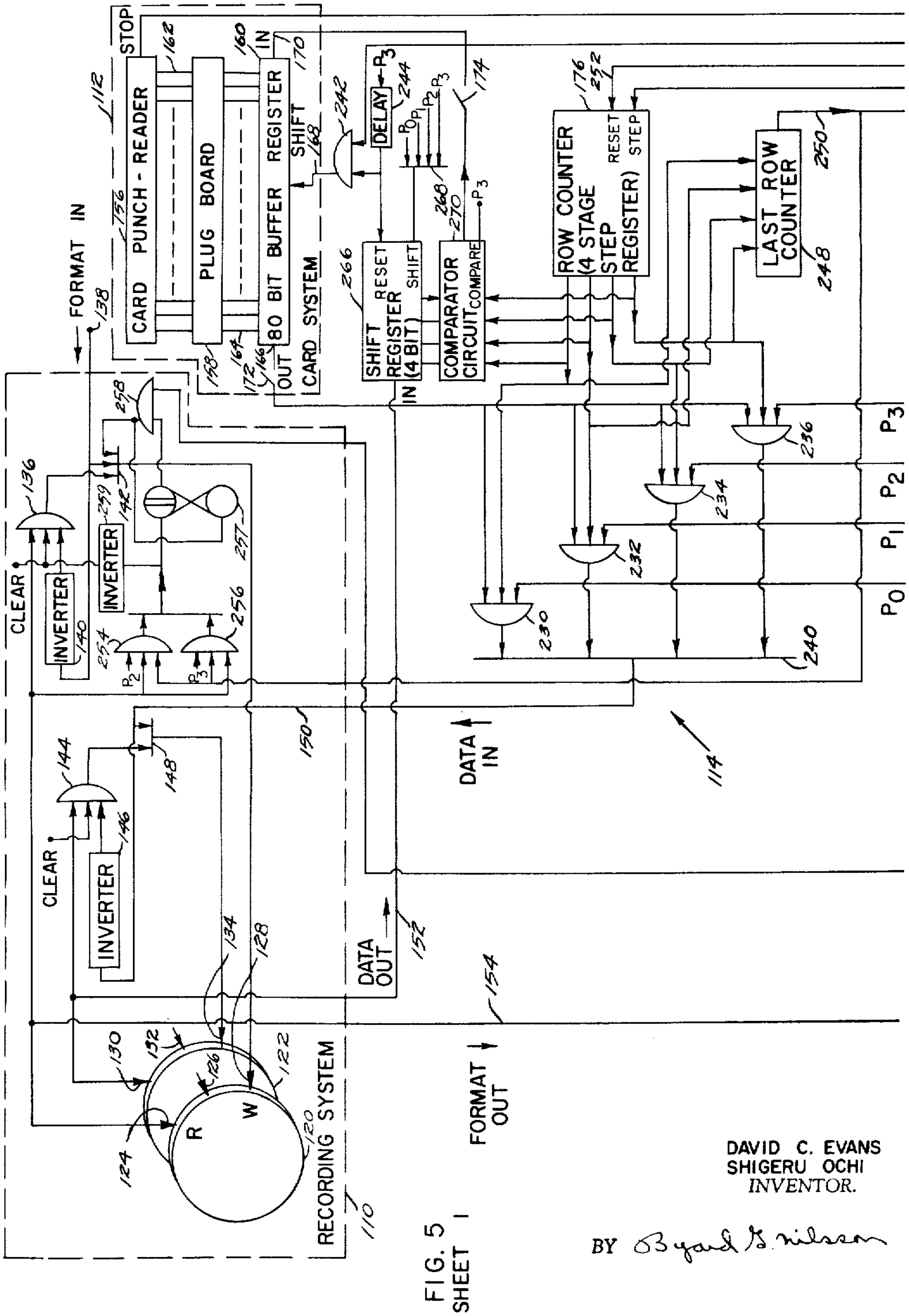
FIG. 5 SHEET I
DAVID C. EVANS
SHIGERU OCHI
INVENTOR.
BY Byard G. Nilsson United States Patent Office 3,025,499
Patented Mar. 13, 1962

3,025,499

TABULATING CARD SYSTEM

David C. Evans, Playa Del Rey, and Shigeru Ochi, Los Angeles, Calif., assignors to The Bendix Corporation, a corporation of Delaware Filed Sept. 26, 1958, Ser. No. 763,677
8 Claims. (Cl. 340—172.5)

The present invention relates to a tabulating-card system for transferring information between a tabulating-card apparatus and a serial-memory apparatus as an electronic computing machine.

Punched cards have come into widespread use for storing data. In general, punched cards have become somewhat standardized in the form of a rectangular card including a number of rows of punch locations, the punch locations in each row being arranged in a number of columns. Normally, many more columns are provided than rows. According to the somewhat-conventional manner of recording data in a punch or tabulating card, each column is employed to represent a single numerical or alphabetical character. In accordance with this manner of representation, certain of the rows are designated as numeric rows and a hole punched in one of these rows indicates a particular number. In order to represent alphabetical characters, two holes may be punched in a single row whereby to indicate various alphabetic characters.

In order to employ the data or information recorded on punch cards, it is often desirable to transfer such information into an electronic computing machine. One class of electronic computing machines employs a so-called serial memory in which binary digits are sequentially recorded. Generally, information sensed from a punch card is not in a proper form to be transferred into a serial-memory electronic computer. Of course, a card image could be employed within the memory of the machine to represent the array of the punched card. However, the necessary computations and processing attendant the use of a card image are time-consuming and require elaborate programming techniques.

The present invention, in general, comprises a system for transferring information registered by means of punch cards into a serial-type binary memory. In the operation of the system the rows of the punch card are essentially sequentially scanned to provide binary signal indications indicative of the data recorded on a punch card. Of course, in general, each column of the punch card represents only a single alphanumeric character; therefore, as the rows are sequentially sensed, they may be reduced to representations in a single memory channel capable of accommodating a number of binary-coded characters equivalent to the number of columns on the card. The present invention incorporates a novel manner of developing signal indications representative of the information recorded by punch cards, and furthermore provides a novel system for controlling the flow of information between a punch-card system and a serial-memory system.

An object of the present invention is to provide an improved system for interconnecting systems in which incompatible codes are employed.

Another object of the present invention is to provide an improved system for transferring information between a punch-card apparatus and a serial-memory apparatus.

These and other and incidental objects of the present invention will become apparent from the following detailed description, when taken in conjunction with the appended drawings, wherein.

Figure 1:
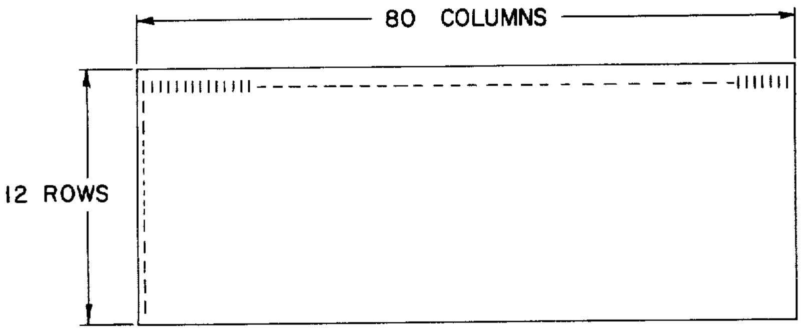
FIGURE 1 shows a diagrammatic-representation of a somewhat conventional punch card.

Referring now to FIGURE 1, there is shown a somewhat-conventional punch card which provides spaces for holes to be punched variously in an array consisting of eighty columns and twelve rows. As previously indicated, each column is normally employed to represent a single character. If the character is numeric, only a single hole is punched in the column; however, if the character is alphabetic, then a plurality of holes are punched in a row. A consideration of the card of FIGURE 1 indicates that the card is capable of recording eighty alphanumeric characters. As will be explained in full detail hereinafter, the present invention functions to convert the eighty characters indicated by the card of FIGURE 1 into eighty binary-coded characters. In the case of numeric characters four binary digit positions are employed while six digit positions are employed to represent alphanumeric characters.

Figure 2:
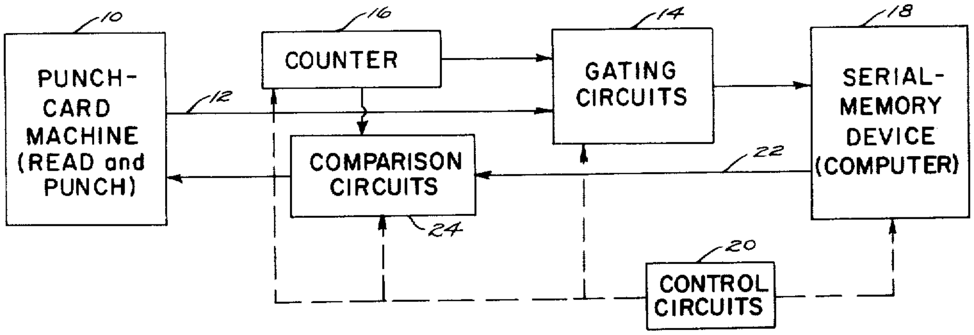
FIGURE 2 shows a diagrammatic-representation, broadly indicating the operation of an apparatus constructed in accordance with the present invention.

Reference will now be had to FIGURE 2 for a preliminary consideration of the operation of a system incorporating the principles of the present invention. In FIGURE 2, there is represented a punch-card machine 10 which may comprise various machines for sensing and punching punch cards. Normally, the machine 10 functions to sequentially operate upon the rows of a punch card. During intervals of operation when information is to be taken from a punch card, each row of information is temporarily stored in the machine 10 and scanned out in a serial fashion over a line 12 to a system of gating circuits 14. The gating circuits 14 also receive signals from a counter 16. As the punch cards are scanned to form signals indicative of holes, the counter 16 operates to provide signals indicative of the row being scanned in the machine 10. Therefore, upon the occurrence of a hole in a punch card as sensed by the machine 10, the gate circuits 14 are qualified to allow binary-coded signals from the counter 16 to pass into a serial-memory device 18, which may take the form of an electronic computer having a magnetic-drum memory.

The operation of the counter 16, the gating circuits 14, and the serial-memory device 18 is synchronized and controlled by control circuits 20 which are connected into the system through control circuits indicated by dashed lines.

The operation of the system to transfer information from the serial-memory device 18 to the punch card machine 10, wherein punch cards are punched, is similarly controlled by the control circuits 20. Information flow during this mode of operation is from the device 18 through a line 22 to a system of comparison circuits 24. The comparison circuits 24 receive signals from the counter 16 which indicate the significance of the location in a punch card currently under consideration within the machine 10. Upon the coincidence of similar signals from the counter 16 and the device 18, the comparison circuits 24 provide a signal to the machine 10 which commands the machine to punch a hole in the currently-considered location of a punch card.

It is to be noted, with regard to FIGURE 2, that a single pulse or signal to or from the machine 10, as in the line 12, may indicate an alphanumeric character; whereas, in the lines to and from the device 18, as line 22, a plurality of pulses, e.g. four or six pulse positions, are normally required to represent an alphanumeric character. Therefore, during the interval that the machine 10 considers a single punch position, the device 18 must sequentially consider a plurality of binary digit locations. The timing operation between these components in the composite system is provided by the control circuits 20 which are in turn controlled by a signal derived from the device 18 as will be hereinafter explained in detail.

Figures 3, 4:
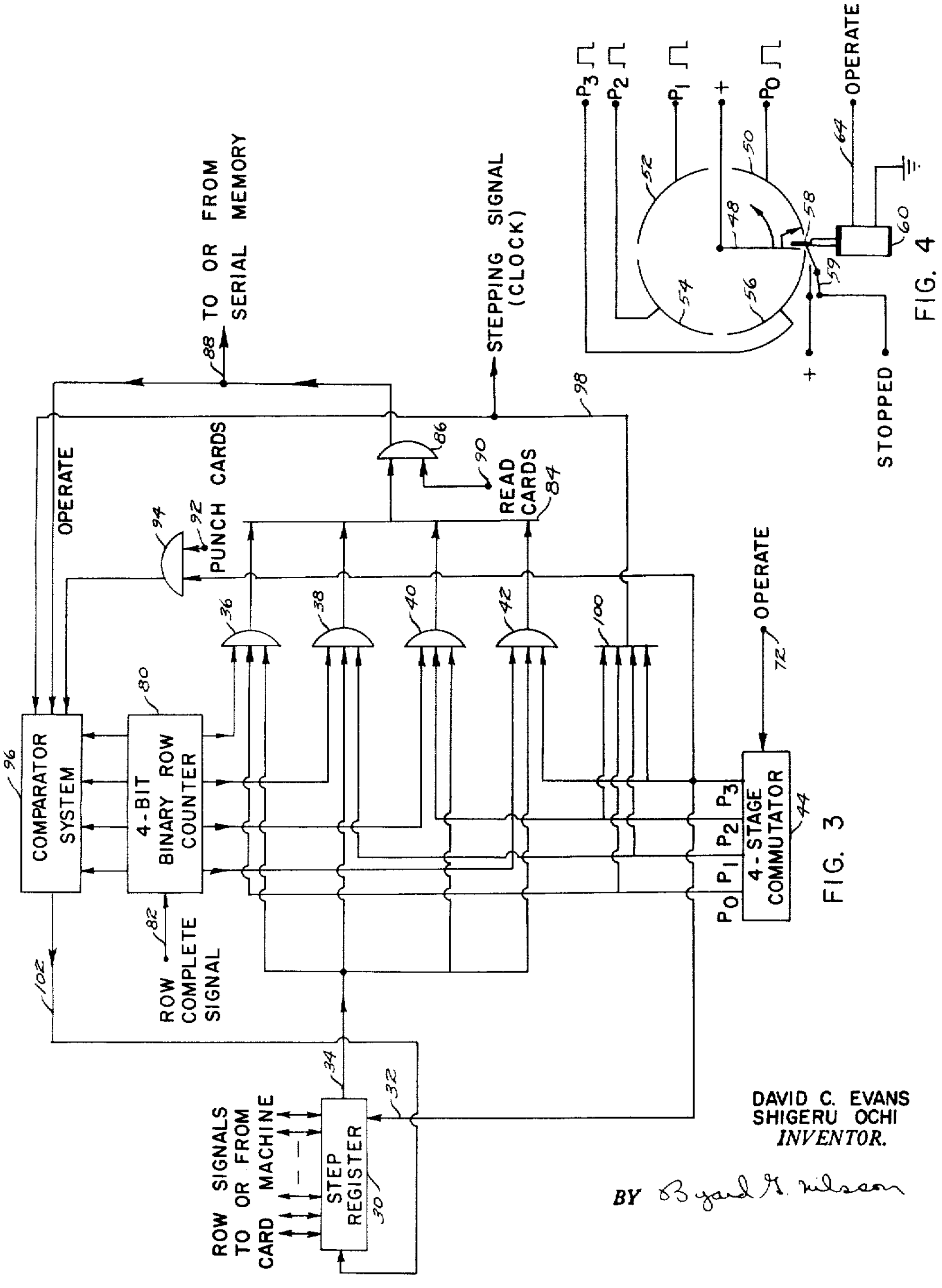
FIGURE 3 shows a diagrammatic-representation of a preliminary system constructed in accordance with the present invention.
FIGURE 4 shows a schematic diagram of a circuit which may be employed in a system of the present invention.

Reference will now be had to FIGURE 3 which shows a preliminary system constructed in accordance with the principles of the present invention. The system shown in FIGURE 3 may be best considered by considering the operation in a step by step fashion as the component parts of the system are introduced. Assume initially that information is to be transferred from a punch card apparatus to a serial-memory device. The rows of the punch cards are read in sequence and the individual bits of each row are registered in a parallel fashion in a step register 30. The step register 30 may comprise a series of interconnected binary devices as flip-flop circuits. The circuits are interconnected in such a manner that the content thereof may be progressively stepped through the register 30 by pulses applied at an input 32 of the register 30. Various counter circuits of this type are well-known in the prior art one of which is shown and described in United States Patent No. 2,735,005, issued February 14, 1956, to F. G. Steele.

As the binary digits registered in the step register 30 are progressively stepped through the register they sequentially appear on an output conductor 34 which is connected to the input of each of the gate circuits 36, 38, 40 and 42. These gate circuits are so-called "and" gates or coincidence gates, and function to provide a high value of a two-state signal at a time when all the two-state input signals are at a high level. Various forms of "and" gates are well-known in the prior art and one form is shown and described in United States Patent No. 2,769,971, issued November 6, 1956, to C. J. Bashe. The gate circuits 36, 38, 40 and 42 are each connected to receive different of the pulses $P_0$, $P_1$, $P_2$ and $P_3$ from a commutator 44. The pulses from the commutator 44 appear in sequence in the order of their subscript designation. The commutator 44 may take various forms and will normally be an electronic commutator; however, an exemplary form for the commutator 44 which illustrates its mode of operation is shown in FIGURE 4 to which reference will now be made. FIGURE 4 shows a rotating contact 48 which sequentially engages annular segments 50, 52, 54 and 56. The contact 48 is driven through a sliding clutch by a motor (not shown) so that the contact 48 is in motion in a counterclockwise direction unless held. The contact 48 is connected to a source of positive potential and therefore sequentially provides pulses $P_0$, $P_1$, $P_2$ and $P_3$. The contact 48 may be stopped by a lock 58 affixed upon the armature of a solenoid 60. Application of an operate pulse through a conductor 64 to the solenoid 60, the armature is withdrawn to allow the contact 48 to move through one revolution. After one revolution, the armature again holds the contact 48 against movement. As the contact 48 makes a revolution, it engages segments 50, 52, 54 and 56 to provide the pulses $P_0$, $P_1$, $P_2$, and $P_3$ in sequence.

Returning now to a consideration of FIGURE 3, it may be seen that the commutator 44 sequentially applies positive pulses to the gate circuits 36, 38, 40, and 42. These pulses all occur during one binary digit, manifested in the conductor 34.

A binary counter 80 comprises four binary stages which are individually connected to the gate circuits 36, 38, 40 and 42. The binary counter 80 may take various forms including that shown and described in the above-referenced Steele patent. The state of the binary counter 80 is made to coincide with the row of a card which is registered in the register 30. That is, each time a new row of binary signals from a card is registered in a parallel fashion in the register 30, the binary counter 80 is stepped through a conductor 82 to place the counter 80 in a state indicative of the row under consideration. Therefore, upon the occurrence of a high value of a two-state signal in the conductor 34, indicating a hole punched in a particular row in a punch card, each of the gate circuits 36, 38, 40 and 42 receive a qualifying signal. During this interval, the commutator 44 provides qualifying signals to the gate circuits in sequence in the form of the pulses $P_0$, $P_1$, $P_2$ and $P_3$. Also during this interval, the binary counter 80 provides signals to the gate circuits 36, 38, 40 and 42 which are indicative of the signal from the register 30 as it is represented in a punch card. Therefore, the four-bit character registered in the binary counter 80 is transformed into a serial four-bit character by the sequential operation of the gate circuits 36, 38, 40 and 42 affected by the commutator 44.

The output signals from these gate circuits are passed through a so-called "or" gate 84 and "and" gate 86 to an output conductor 88 which may be connected to a serial-type memory. The "or" gate 84 is represented by a symbol used here throughout and may take the form of a circuit shown and described in the above-referenced Bashe patent. The "and" gate 86 is qualified by a signal applied at a terminal 90 commanding the operation of read cards.

Thus it may be seen that the system operates to essentially scan a punch card row-by-row and upon the occurrence of a hole in the card, a four-bit binary character is formed in a sequential fashion indicative of the hole and passed to be recorded in a serial-memory device.

Consider now the operation of the system shown in FIGURE 3 to translate from four-digit characters into punch-card characters. To effect this mode of operation, the gate circuit 86 is disqualified by the occurrence of a low value of the two-state signal applied at terminal 90. However, a high value of a two-state signal is applied to a terminal 92 to qualify an "and" gate 94. The output from the gate 94 is applied to a comparator system 96 with an input signal from the conductor 88 and timing or clocking signals appearing in conductor 98 and derived by applying the pulses $P_0$, $P_1$, $P_2$ and $P_3$ to an "or" gate 100. The comparator system 96 is also connected to the individual stages of the binary counter 80, and has an output connected through conductor 102 to the input of the step register 30.

The comparator system 96 may comprise a plurality of "and" and "or" gates connected to perform a comparison between the individual digits registered by the counter 80, and a sequence of four digits appearing in the conductor 88 from the serial-memory system. Additionally, binary circuits may be provided in the comparator system 96 to effect the registration of digits undergoing comparison or the determination of individual comparisons. Various circuits for performing the function of the comparator system 96 are well-known in the art as described hereinafter; however, it is noteworthy at this point to consider the logical equation of the comparator system. In the logical equation the letters $w$, $x$, $y$ and $z$ indicate the digits of four-digit characters, the subscript 1 indicating one character and the subscript 2 indicating the other character. The negations of the signals carry prime marks. The logical equation of the comparator system 96 is:

$$\text{compare}=\text{operate}\ [(w_1w_2+w_1'w_2')(x_1x_2+x_1'x_2')(y_1y_2+y_1'y_2')(z_1z_2+z_1'z_2')]$$

From the above it may be seen that a high value of the two-state signal in the line 102 will occur at a time when the character indicated by four binary digits read from a serial-type memory over conductor 88 coincides to the character registered in the four-digit counter 80. The high value of the signal in the line 102 is placed in the step register and after the register is filled the content thereof is employed to set up a card machine to punch a single row in a punch card.

It is to be noted, as previously indicated, that one channel in the serial-memory device containing say eighty characters will be repeatedly scanned and thereby compared during repeated scannings with the value indicated by holes in various rows in a punch card. That is, as the step register 30 is set to punch each row in the card, the counter 80 is set to coincide to the value of the row being processed and any characters received from the serial-memory machine indicative of that row are placed in the register 30.

It is also noteworthy that in certain instances as in the representation of alphabetic characters, two holes may be punched in a single column. In such an event, an additive combination of four-digit characters may be employed for the representation. That is, the code may be selected whereby additive combinations produce a character indicated by two holes punched in a single column of a card.

In the system of FIGURE 3, no provision is made for controlling the flow of information between the apparatus with which the system is employed. A system incorporating the principles of the present invention and including control circuits and apparatus will now be considered with reference to FIGURE 5.

Figure 5:
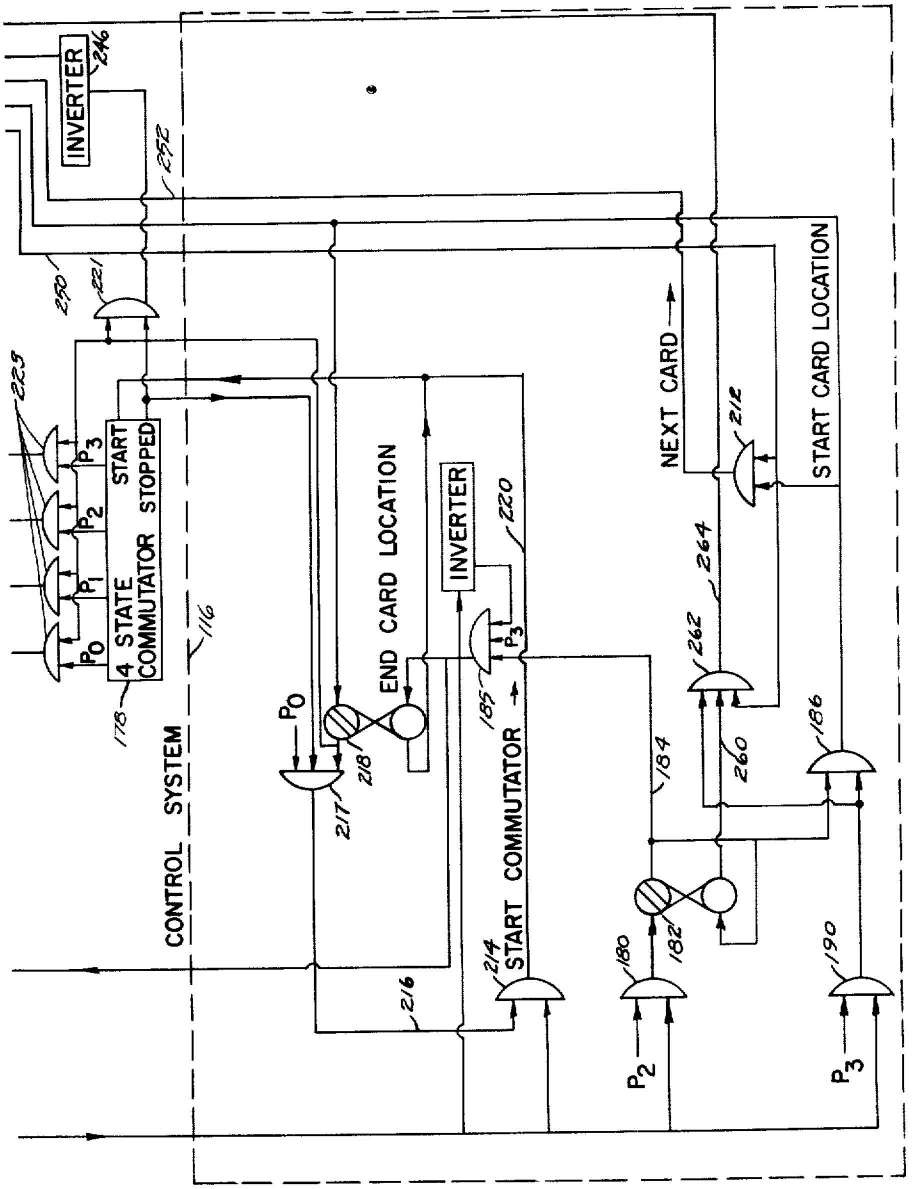
FIGURE 5 (Sheets 1 and 2) shows a diagrammatic-representation of a system constructed in accordance with the present invention.

Referring to FIGURE 5, there is shown a recording system 110 which may be incorporated in a serial-memory device, e.g. an electronic computer. In the system of FIGURE 5, information is translated between the recording system 110 and a punch-card system 112. To effect the translation between the recording system 110 and the punch-card system 112, a plurality of circuits for performing comparisons and generating signals are provided which are indicated generally by the numeral 114. Operating in conjunction with the recording system 110, the card system 112 and the circuits 114 is a control system 116 which serves to control the flow of information and furthermore to identify the characters comprising information and data flowing within the system.

The details of certain portions of the above-described components will be considered preliminary to a description of the operation of the composite system.

Referring now to FIGURE 5, consider first the details of the recording system 110, which incorporates a serial-memory. The recording system 110 includes a magnetic drum including channels 120 and 122. Of course, the channels 120 and 122 comprise simply tracks around the periphery of a drum coated with a magnetic material suitable for recording digital signals. The channels 120 and 122 are connected to a motor (not shown) and are revolved at a high rate of speed so that the magnetic tracks of the channels pass under translating heads mounted adjacent thereto. Specifically, the channel 120 operates in conjunction with a read head 124, an erase head 126 and a write head 128. In a similar fashion, the channel 122 operates in conjunction with a read head 130, an erase head 132 and a write head 134. The construction of the channels 120 and 122 and their associated heads is well-known in the prior art and does not require further detailed consideration herein. Furthermore, additional circuitry may be employed in conjunction with the channels 120 and 122 including amplifiers and similar signal-handling circuitry; however, digital-recording techniques of this type are sufficiently well-known that further detailed consideration herein is not necessary.

In general, information signals sensed by a read head are erased by an erase head and circulate by external circuitry to be re-recorded upon a drum channel by a write head. In the event that signals are to be replaced in a channel, the recirculation path is blocked and the replacement signals are applied to the appropriate write head. The details of the external circulating circuitry associated with the channel 120 will now be considered.

The read head 124 is connected to an "and" gate 136 which is also connected to receive a signal from an input terminal 138 through an inverter circuit 140. The inverter circuit functions to reverse or invert the state of two-state signals, that is, in the event the inverter circuit receives a high two-state signal it will provide a low two-state signal. Various forms of inverter circuits capable of functioning to perform this operation are well-known in the prior art one of which is shown and described in the above-referenced Bashe patent.

The output from the "and" gate 136 is applied through and "or" gate 142 to the write head 128. In the operation of the recording system, digital signals are sensed by the write head 124 and applied to the "and" gate 136. Unless replacement signals are applied at the terminal 138, a high signal appears at the output from the inverter 140 to qualify the gate circuit 136 thereby allowing the signals read from the channel 120 to pass and be re-recorded by the write head 128. However, in the event that replacement signals are applied at the terminal 138, the output from the inverter circuit 140 is at a low value thereby blocking the "and" gate 136. In this event, the replacement signals pass through the "or" gate to be recorded by the write head 128 after the channel is clear.

The external circuitry associated with the channel 122 is similar to that described above and includes an "and" gate 144, an inverter circuit 146 and an "or" gate 148.

It may therefore be seen that information will simply cycle within the recording system 110 until replacement information appears either at the terminal 138 or on an input conductor 150 associated with the channel 122.

According to the operation of the system of FIGURE 5, data or information signals are recorded in the channel 122 while format or control signals are recorded in the channel 120. Simultaneously with the circulation of these signals the data and format signals appear upon conductors 152 and 154 respectively to be employed in the system.

The punch-card system 112 of FIGURE 5 includes a card punch-reader 156, a plug board 158 and a buffer register 160. The machine 156 may comprise various forms of tabulating card equipment readily available which function to process punch cards a row at a time and either sense the content of the card or punch holes in the card to represent data. In the event that eighty columns are present in the cards to be processed, the machine 156 will provide eighty two-state output signals in parallel form. These signals are connected by conductors 162 to the plug board 158. The plug board may be employed to alter the arrangement of the eighty parallel signals. The output from the plug board 158 comprises eighty parallel conductors 164 which are connected to the register 160.

In the operation of the system of FIGURE 5, the machine 156 operates at a predetermined speed so that the row of signals placed in the register 160 will invariably be recorded by the recording system 110 prior to the time when a new row of signals enter the register 160. Of course, in various arrangements buffer storage may be provided to adjust for varying rates of operation between the system 110 and the machine 112.

The register 160 comprises a serial shift register capable of receiving a plurality of binary signals in individual stages and including means for altering the binary stages in a parallel manner. The register may be constructed in accordance with the register of the above-referenced Steele patent, or alternatively may employ various static storage devices as for example as shown in Patent No. 2,708,722, granted May 17, 1955, to An Wang, or Patent No. 2,654,080, issued September 29, 1953, to F. A. Browne.

The entry and exit of signals in a parallel fashion to the register 160 through conductors 164 is controlled by the machine 156. The sequential shifting of binary signals within the register 160 whereby these signals sequentially appear on an output conductor 166 is effected by pulses applied to the register 160 through a shift conductor 168. When information is passed from the register 160 to the machine 156, information enters the register 160 in serial fashion through conductor 170.

The detailed operation of the system of FIGURE 5 may now best be considered by assuming an initial state of operation and pursuing the description of the system simultaneously with the sequence of operation. Therefore, assume initially that information is to be taken from punch cards in the card system 112 and recorded in the recording system 110. Preliminary to considering the detailed operation of the system of FIGURE 5 the format information recorded in channel 122 will be considered. The signal indications on channel 120 serve to identify the data recorded in the channel 122 and furthermore to control the movement of data in and out of the channel 122. Each character recorded in the channel 122 comprises four binary digits which are timed to coincide with pulses $P_0$, $P_1$, $P_2$ and $P_3$ similar to the pulses similarly identified with respect to FIGURE 3. Table I set out below indicates the coding of various characters in channel 120 to identify and control the movement of the data signals on and off the channel 122.

*Table I*

| Indication | Code | | | |
|---|---|---|---|---|
| | $P_0$ | $P_1$ | $P_2$ | $P_3$ |
| Character | 1 | – | – | – |
| End of card location in memory channel | – | – | 1 | 0 |
| Last card to be processed | – | – | 0 | 1 |
| Start card location in memory channel | – | – | 1 | 1 |

Assume now that the system is to function to transfer information from cards sensed in the card system 112 to the recording system 110. Preliminary to such operation a switch 172 serially connected with conductor 166 is closed while a switch 174 serially connected with the conductor 170 is opened. Next, a four-stage counter 176 is assumed to be placed in a zero-indicating state. The counter 176 may be of a similar structure as the counter 80 in FIGURE 3 and may be constructed in accordance with the counter shown and described in the above-referenced Steele patent. A commutator system 178 or electronic ring counter the mechanical equivalent of which is shown in FIGURE 4 is then placed in a stopped condition whereby upon initiating operation the pulse sequence flowing therefrom will start with the pulse $P_0$. The machine 156 is next turned on causing the first row of a card to be read through the plug board 158 into the register 160. This information remains quiescent temporarily because no pulses appear in the conductor 168.

The channels 120 and 122, continuously functioning to cycle information signals now revolve until the occurrence of a signal from channel 120 indicating the presence of a card location. That is, the information from each card is registered in a predetermined location in the channel 122 in accordance with the format recorded on the channel 120. Of course, the format is recorded in the channel 120 prior to the operation of the system by applying format signals at the terminal 138 of the recording system.

As the channel 120 is scanned, a code character ——11 is sensed which is manifested by pulses occurring during the intervals of timing pulses $P_2$ and $P_3$. The occurrence of a pulse during the timing pulse $P_2$ results in the qualification of an "and" gate 180 thereby setting a binary circuit 182 to provide a high output to a conductor 184, which is connected to a gate circuit 185 and an "and" gate 186. The application of this signal to the gate circuit 185 has no effect because the next interval, $P_3$ a pulse is received from the format channel which is applied to an inverter 187 which causes the output therefrom to be low to inhibit the gate 185.

The signal applied to the gate 186 from gate 190 qualifies the gate circuit 186 upon the occurrence of the pulse during $P_3$ of the code character, and a signal is passed.

The signal passed by the gate 186 indicates the start of a card location on in the channel 122. This signal sets a flip flop 218 in a state to provide a high signal to an "and" gate circuit 217.

Figure 6:
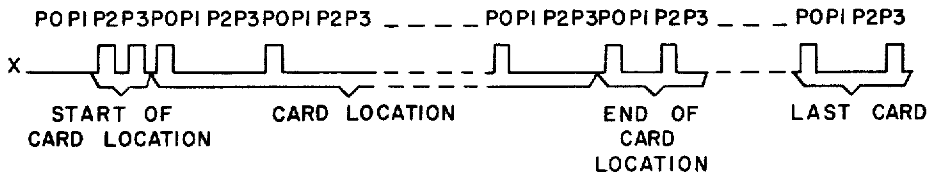
FIGURE 6 shows a wave form illustrative of signals occurring within the system of FIGURE 5.

The occurrence of the pulses during intervals $P_2$ and $P_3$ from the format recorded in the channel 120 is graphically shown in FIGURE 6. That is, the wave form of FIGURE 6 shows a pair of pulses occurring during the time of pulses $P_2$ and $P_3$ which indicate the appearance of a card-registering location in the channel 122. As further indicated in FIGURE 6, a pulse during the interval $P_0$ follows the previous pulses to indicate that a character should be recorded in a similar position in the channel 122. At the instant of the pulse during the interval $P_0$ an "and" gate 214 is qualified. A high signal is provided the gate 214 from the gate 217 during $P_0$, because the flip flop 218 is set, and the commutator 178 is stopped. Therefore the pulse from the format channel 120 during the period of $P_0$, is passed through the gate 214 to start the commutator. In operation, the commutator 178 is synchronized with the rotation of the channels 120 and 122. In fact, timing signals are provided to interconnect these elements; however, the provision of such timing signals is well known in the prior art and to prevent further complicating the drawings are not shown herein.

As the channels 120 and 122 are moved and format signals are read from the channel 120 as shown in FIGURE 6, the commutator 178 provides the sequence of pulses $P_0$, $P_1$, $P_2$ and $P_3$ in time coincidence with the individual digit positions in the channels 120 and 122. The pulses $P_0$, $P_1$, $P_2$ and $P_3$ from the commutator 178 are individually connected to "and" gates 230, 232, 234 and 236. These gate circuits are also connected individually to the stages in the row counter 176 which is set to indicate signals indicative of the first row in the card under consideration. Therefore, in a manner similar to the operation of the system shown in FIGURE 3, in the event that a pulse or positive signal is carried from the register 160 over the line 166, which is also connected to the gate circuits 230, 232, 234 and 236, these gate circuits will be qualified to pass a character comprising four serial digit positions.

The signals passed by the gate circuits 230, 232, 234 and 236 are passed through an "or" gate 240 to the conductor 150 to pass into the recording system 110 and be recorded as hereinbefore explained in channel 122.

After the first cycle of the commutator 178 to provide pulses $P_0$, $P_1$, $P_2$ and $P_3$, the "and" gate circuit 242, which is connected to the shift line 168 of the register 160 is qualified and passes the pulse $P_3$ after a brief delay incurred by a delay circuit 244. Therefore, the content of the register 160 is stepped one position to move the signal in the second column of consideration to determine the output to the line 166. Of course in the event that a high signal occurs indicating a hole in the associated position of the card, then the gate circuits 230, 232, 234 and 236 are again sequentially qualified; however, in the event a low signal appears in the conductor 166, then the gate circuits 230, 232, 234 and 236 are not qualified and zero information is entered in the recording channel 122. It is to be noted, that the gate circuit 243 is qualified to shift the content of the register 160 only after the commutator 178 operates under control of gate circuit 214 in view of a connection from the binary 218 through a gate circuit 221 which is also connected to receive a signal from the commutator indicating the commutator is stopped. The gate 221 is connected through an inverter circuit 246 to the gate 242. That is, during the interval before a comparison operation is performed, the commutator 178 operates continuously under control of a signal from the flip flop or binary circuit 218. However, when the binary 218 is set and the signal from the binary to the commutator goes low, the commutator stops and provides a high signal (as by closing contacts 59 in FIGURE 4). Then after the card location is started, the commutator receives a pulse from gate 214, upon completion of each revolution, and therefore essentially operates continuously. However, the pulses $P_0$, $P_1$, $P_2$, and $P_3$ are effective to operate the gates 230, 232, 234 and 236, only after the gates 223 are qualified by a signal from the binary 218 indicating the system is in a "start card location" state.

After the first card location identified in the channel 122 has been scanned, a format code 10 occurs, timed by pulses $P_2$ and $P_3$, as indicated in FIGURE 6 and Table I to indicate the end of the card location. This signal results in the qualification of the gate circuit 185 which resets the binary 218 in the state to provide a low signal to the gate circuits 218 and 223. These gates are therefore inhibited and stop translation until the card location is again scanned, during which time the digits of the second row of the card will be considered for entry into the card location.

During the interval when the gates 223 are inhibited, the second row of signals from the machine 156 are transferred into the register 160. This operation may be synchronized by a control signal or the timing of the system may be designed to be compatible.

With new signals in the register 160, the channels 120 and 122 revolve as previously described, until the code character 11 is detected indicating the start of the card location at which time the gate circuits 180 and 190 are again qualified in sequence to qualify the gate 186 which in turn sets the binary 218 and steps the row counter 176 to indicate the second row. Thereafter, the gate circuit 214 is qualified and starts the commutator 178 in synchronism with the pulses from the drum carrying the channels 120 and 122. Thus the rows of a card are selectively scanned and recorded as four-digit characters in a card location on the drum. At the completion of a card, the row counter 176 possesses a state indicative of the last row of the card. This state is detected by a last-row detector 248 by a series of gate circuits which are variously arranged depending upon what the last row is, and provide a high signal in a conductor 250 upon the occurrence of the last row. Of course, the last row detector may simply comprise a plurality of "and" gates and inverters which detect the code indicative of the last row.

Upon the occurrence of a high signal in the conductor 250, the gate circuit 212 is qualified and with the occurrence of the end of the card location during which interval a card is indicated to be completed, and the gate circuit 212 passes a high signal through conductor 252 to reset the row counter preparatory to the entry of another card for consideration.

The output from the last-row detector to the conductor 250 is also applied through a pair of "and" gates 254 and 256 which are also connected to receive information signals from the read head 124. The gate circuit 254 is connected to receive the pulse $P_2$ and the gate circuit 256 is connected to receive the pulse $P_3$. Therefore, upon the occurrence of signals from the format channel 120 in the form of pulses occurring simultaneously with the pulses $P_2$ and $P_3$, indicating the first card location, the gate circuits 254 and 256 will be qualified and pass pulses during these intervals $P_2$ and $P_3$ to the inverter circuit 259 thereby driving the normally high qualifying signal of the gate 136 to a low level and preventing the signals from being re-recorded. Similarly, the pulses from the gate circuits 254 and 256 are applied to set a binary 257. At the end of the card location, the binary and the "end of card location" signal from the gate 185, qualify a gate 258 to record a pulse in the $P_3$ position of the format channel 120. As a result the code character ‒‒1‒ indicating the end of a card location, is changed to ‒‒11, to indicate the beginning of the next card location.

In this manner, cards are individually processed row-by-row and entered in a single 320-digit location in the channel 122. That is, as indicated in the above Table I a four-digit code including the pulse $P_3$ and no pulse during the interval $P_2$ indicates the last card location. Wave form indicative of this code is shown in FIGURE 6. Upon recording a pulse during the interval of $P_3$, the code character is altered.

The system then fills another card location and continues to process cards until the format channel 120 commands that the last card is processed by presenting the code character ‒‒01. This character qualifies of the gate circuit 262, which results in a signal in conductor 264 that is applied to the machine 256 and serves to turn the machine off.

It may therefore be seen that the information or data on a plurality of punch cards may be selectively read and translated into a form suitable for recording in a serial-memory device in accordance with the principles of the present invention. In a similar fashion, signals may be sensed from the recording system 110 to be recorded on punch cards in the system 112. The operation of sensing information to punch cards will now be considered.

The operation of the system to transfer data from the recording system 110 to punch cards handled by the card system 112 is quite similar to the reversal of this process in that a similar format control code is employed. Preliminary to punching cards, the switch 166 adjacent the register 160 is opened and the switch 174 serially connected with the input to the register 160 is closed. Next, the row counter 176 is placed in a zero-indicating state. The card punch-reader 156 is next placed in operation to punch cards a row at a time from information contained in the register 160. With the recording system 110 and the card system 112 both operative, the gate circuits 180 and 190 function to detect the code indicative of the first card location and function to start the row counter 176. The row counter is thereby stepped to a state indicating the code representative of the first row of the card. Next, the gate circuit 214 is qualified as previously described to start the commutator 178 in synchronism with the recording system 110. Upon the starting of the commutator 178, qualified pulses $P_0$–$P_3$ are applied in sequence to shift the digits in the line 152 through a shift register 266 of the type previously described. The pulses are applied through an "or" gate 268. Each cycle of the commutator 178, while gates 223 are qualified steps a four-bit character into the shift register 266. Then, upon the occurrence of the pulse $P_3$ applied to a comparator circuit 270 a comparison is performed between the content of the register 266 and the row counter 176. The comparator circuit 270 may take the form of that previously described with respect to FIGURE 3. In the event that the comparator circuit senses a coincidence between the content of the register 266 and the counter 176, a pulse is applied through the switch 174 to the input of the register 160. This pulse overlaps with a pulse derived from the pulse $P_3$ by passing the pulse $P_3$ through the delay circuit 244. The pulse from the delay circuit 244 is applied to the gate circuit 242 with a signal from the inverter 246 indicating that the commutator is operative, whereby the register 160 shifts a digit into storage indicating that a hole should be punched in the row under consideration. After the card location on the channel 122 has been scanned, the code indicating the end of the card location is sensed to stop the commutator 178 as previously described. Upon the next cycle of the channel 122, the row counter 176 is advanced to indicate the second row of a card and any signals which should be placed in the second row of the card are sensed and shifted into the register 160 just as described with respect to signals indicative of the first row. Thus information is read from the channel 122 in the form of four-bit characters, converted into single-bit characters which have a particular significance in view of the row in which the characters are recorded in a punch card. This information is then employed to punch the cards and thereby register information translated from a serial-type storage apparatus.

Upon the completion of the translating operation from the recording system 110 to the card system, the content of the channels 120 and 122 may be cleared as by applying a low signal to the clear terminal of gates 136 and 144.

It is readily apparent that by employing a variation in the code characters, the system may selectively employ characters containing a different number of digits. That is, for example, the commutator, and row counter may operate to provide either four or six digits under control of the format from channel 122. In certain instances, such a mode of operation may be desirable.

From the foregoing, it may be seen that an improved card system is provided by this invention, the scope of which shall be determined in accordance with the following claims.

What is claimed is:

1. A system for use in conjunction with a tabulating card machine and a serial-memory device, for translating between card-represented information signals and serial-memory information signals, comprising: a counter means controlled to provide serial-memory information signals indicative of sequentially considered information locations of cards employed in said card machine; gating means operative during transfer of information signals from said card machine to said serial-memory device, for passing serial-memory information signals from said counter means to said serial-memory device under control of card-represented information signals from said card machine; and comparison means operative during transfer of information signals from said serial-memory device to said card machine, connected to said counter means and to receive serial-memory information signals fom said serial-memory device, for providing card-represented information signals to said card machine upon the occurrence of serial-memory information signals from said serial-memory device coinciding to serial memory signals from said counter means.

2. Apparatus according to claim 1 wherein said counter means comprises a multi-stage binary counter for providing binary-code signals representative of card-represented information signals.

3. Apparatus according to claim 2 wherein said gating means comprises a means for sequentially passing said binary-code signals upon receiving card-represented information signals.

4. A system for use in conjunction with a tabulating card machine and a serial-memory device, for translating between card-represented information signals and serial-memory information signals, comprising: a counter means controlled to provide serial-memory information signals indicative of sequentially-considered information locations of cards employed in said card machine; gating means operative during transfer of information signals from said card machine to said serial-memory device, for passing serial-memory information signals from said counter means to said serial-memory device under control of card-represented information signals from said card machine; comparison means operative during transfer of information signals from said serial-memory device to said card machine, connected to said counter means and to receive serial-memory information signals, from said serial-memory device for providing card-represented information signals to said card machine upon the occurrence of serial-memory information signals from said serial-memory device coinciding to serial-memory signals from said counter means; buffer storage means for registering signals pending utilization by said card machine or said serial-memory device; and control means functioning in conjunction with said serial-memory device for controlling the flow of information signals within said system.

5. Apparatus according to claim 4 wherein said control means functions to time the period of registration of information signals in said serial-memory device.

6. A system for use in conjunction with: a tabulating-card machine, which machine scans tabulating cards and employs first electrical signals indicative of locations on said cards; and a memory device which registers second electrical signals, different from said first electrical signals; said system for translating signals between said machine and said device, comprising: a counter means to provide a sequence of said second electrical signals representative of and in synchronism with the said first electrical signals possible of formation in the scanning by said tabulating-card machine; gating means operative during translation from said machine and said device for passing a representative second electrical signal from said counter means to said memory device upon occurrence of a first signal from said tabulating-card machine; coincidence means operative during translation from said device to said machine for applying first electrical signals to said tabulating-card machine upon receiving similar second signals from said counter means and said memory device; and control means for controlling the direction of information flow between said machine and said device.

7. Apparatus according to claim 6 wherein said control means further includes means synchronized with said memory device for defining the location in said memory device to register signals.

8. Apparatus according to claim 6 wherein said memory device is a serial memory and wherein said control means further includes means for controlling the flow of said signals whereby all said first signals from a card may be registered as second signals in a single serial channel of said memory device.

References Cited in the file of this patent

UNITED STATES PATENTS

| | | |
|---|---|---|
| 2,702,380 | Brustman | Feb. 15, 1955 |
| 2,718,356 | Burrell et al. | Sept. 20, 1955 |